United States Patent [19]
Edwards

[11] Patent Number: 4,790,072
[45] Date of Patent: Dec. 13, 1988

[54] SAW GUIDE HAVING PIVOTAL PROTRACTOR MEANS

[76] Inventor: Gary L. Edwards, 896 Dunn St., Morristown, Tenn. 37814

[21] Appl. No.: 934,029

[22] Filed: Nov. 24, 1986

Related U.S. Application Data

[63] Continuation-in-part of Ser. No. 763,295, Aug. 7, 1985, Pat. No. 4,624,054.

[51] Int. Cl.$^4$ .............................................. B27B 9/04
[52] U.S. Cl. ........................................ 30/376; 83/745
[58] Field of Search ................. 30/371, 372, 373, 374, 30/375, 376; 83/574, 745

[56] References Cited

U.S. PATENT DOCUMENTS

| | | | |
|---|---|---|---|
| 1,700,189 | 1/1929 | Wikstrom | 30/376 |
| 2,818,892 | 1/1958 | Price | |
| 2,819,742 | 1/1958 | Blachly | |
| 3,344,824 | 10/1967 | Greco | |
| 3,481,374 | 12/1969 | Schindler | |
| 3,506,062 | 4/1970 | Hoffman | |
| 3,927,475 | 12/1975 | Chang | |
| 4,016,649 | 4/1977 | Kloster | |
| 4,078,309 | 3/1978 | Wilson | |
| 4,335,512 | 6/1982 | Sheps et al. | |
| 4,397,089 | 8/1983 | Pease | |
| 4,453,312 | 6/1984 | Nishioka | 83/745 X |
| 4,483,071 | 11/1984 | te Kolste | |
| 4,602,435 | 7/1986 | Nishioka | 30/372 |

FOREIGN PATENT DOCUMENTS 2011834 7/1979 United Kingdom .................. 30/373

*Primary Examiner*—E. R. Kazenske
*Assistant Examiner*—Michael D. Folkerts
*Attorney, Agent, or Firm*—Pitts and Brittian

[57] ABSTRACT

A saw guide (14') for controlling the linear path/direction of travel with respect to a reference on an object such as a board being cut, of a rotating saw blade is provided. The guide (14') includes a carriage (18') which carries a rod (44') along one longitudinal edge portion in the preferred embodiment. A travel control mechanism (50'), including a movable sleeve (78) slidably received by the rod (44') controls the direction of travel of the saw from a reference defined on an object to be cut. This mechanism (50') includes a protractor which is rotatably mounted on the sleeve (78). A mechanism for adjusting the rotational position of the protractor with respect to the rod is provided. The protractor can be readily stored above the carriage (18') as desired.

3 Claims, 10 Drawing Sheets

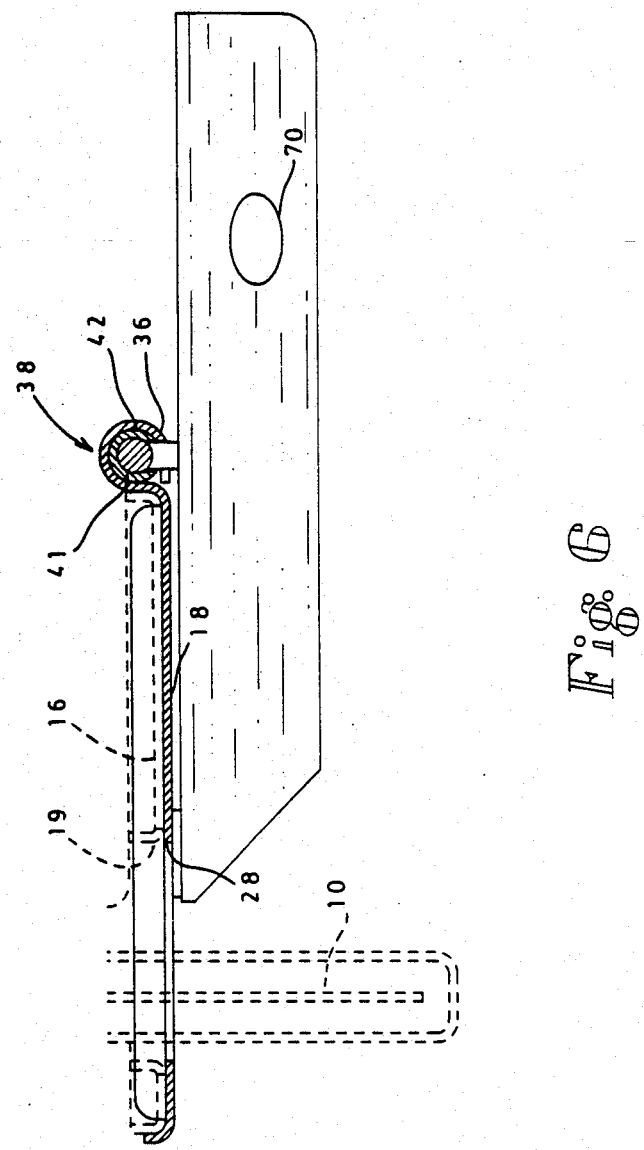

SAW GUIDE HAVING PIVOTAL PROTRACTOR MEANS

This application is a Continuation-In-Part of application of Ser. No. 763,295, filed on Aug. 7, 1985, and due to issue on Nov. 25, 1986, with a U.S. Pat. No. of 4,624,054.

TECHNICAL FIELD

The field of this invention is generally saw guides, and more particularly, an improved Saw guide capable of controlling the linear path/direction of travel of a saw with respect to a reference. The guide can be readily pivoted for storage above the saw base plate such that the saw to which it is attached can readily be used in a conventional manner.

BACKGROUND ART

Guides which control the cutting motions, and more particularly, the direction or travel of rotary or jig type saw blades, have heretofor been known. Typically, such guides incorporate apparatus mounted on the saw shoe or base plate. The known prior art devices generally include structures which limit the use of the saw upon attachment thereto, inasmuch as they must be removed in order to have full use of the saw in a conventional manner having unrestricted motion. Examples of typical prior art devices are disclosed in the following U.S. Pat. Nos.: 2,818,892; 3,344,824; 3,481,374; 3,506,062; 3,927,475; 4,016,649; 4,078,309; 4,335,512; 4,397,089; and 4,483,071.

One of such known prior art patents, U.S. Pat. No. 4,078,309 discloses a mitre saw having means for adjusting the direction of travel of the saw. It will be noted while this device guides the direction of the saw travel, it must be removed in order to have full use of the saw in its conventional mode of operation. Further, it will be noted that a plurality of guiding tracks are provided, and these guiding tracks are positioned below the base plate of the saw.

Accordingly, it is an object of tee present invention to provide a saw guide which can be readily mounted on the base plate or shoe of a saw, and easily pivoted to a stored position such that the saw can be used in its conventional manner with unrestricted motion.

Another object of the present invention is to provide such a guide which minimizes the loss of the effective depth of cut of the blade when mounted on the saw base plate.

Another object of the present invention is to provide such a saw guide which can be readily manufactured, and which is easy to maintain.

DISCLOSURE OF THE INVENTION

In accordance with the present invention, an improved saw guide capable of controlling the linear path/direction of travel of a rotary or jig blade type saw is provided. The disclosed guide includes a carriage, having a substantially planar surface and which defines an opening through which the saw blade extends upon mounting the carriage to the base plate or shoe of a typical saw. A sleeve is carried by one edge portion of the carriage, and slidably receives a rod upon which is mounted a device for controlling the travel, or more specifically, the angle of the linear path of the saw with respect to a reference defined, normally on the object to be cut. This travel controlling mechanism can be readily moved to a stored position such that the device does not interfere with the conventional movement of the saw, if such mode of operation is desired. In the alternate embodiment, the carriage of the saw guide carries a rod along one longitudinal edge portion and a travel control mechanism, including a movable sleeve received by the rod, controls the direction of travel of the saw from a reference defined on an object to be cut. Further, the travel control mechanism includes a protractor which is rotatably mounted on the sleeve, the protractor being capable of being readily stored above the carriage as desired.

BRIEF DESCRIPTION OF THE DRAWINGS

FIG. 6 illustrates the protractor face plate together with the sleeve, bushing, and carriage in sectional view.

BEST MODE FOR CARRYING OUT THE INVENTION

Figure 1:
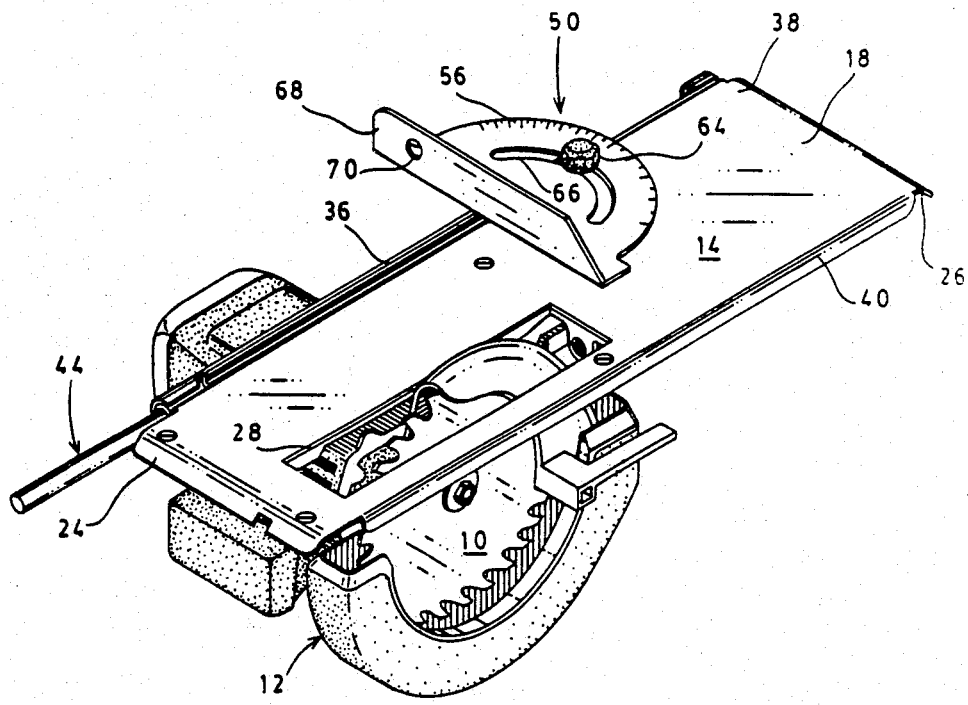
FIG. 1 is a perspective view of an embodiment of the present saw guide mounted on a conventional rotary or jig blade saw.
Figure 2:
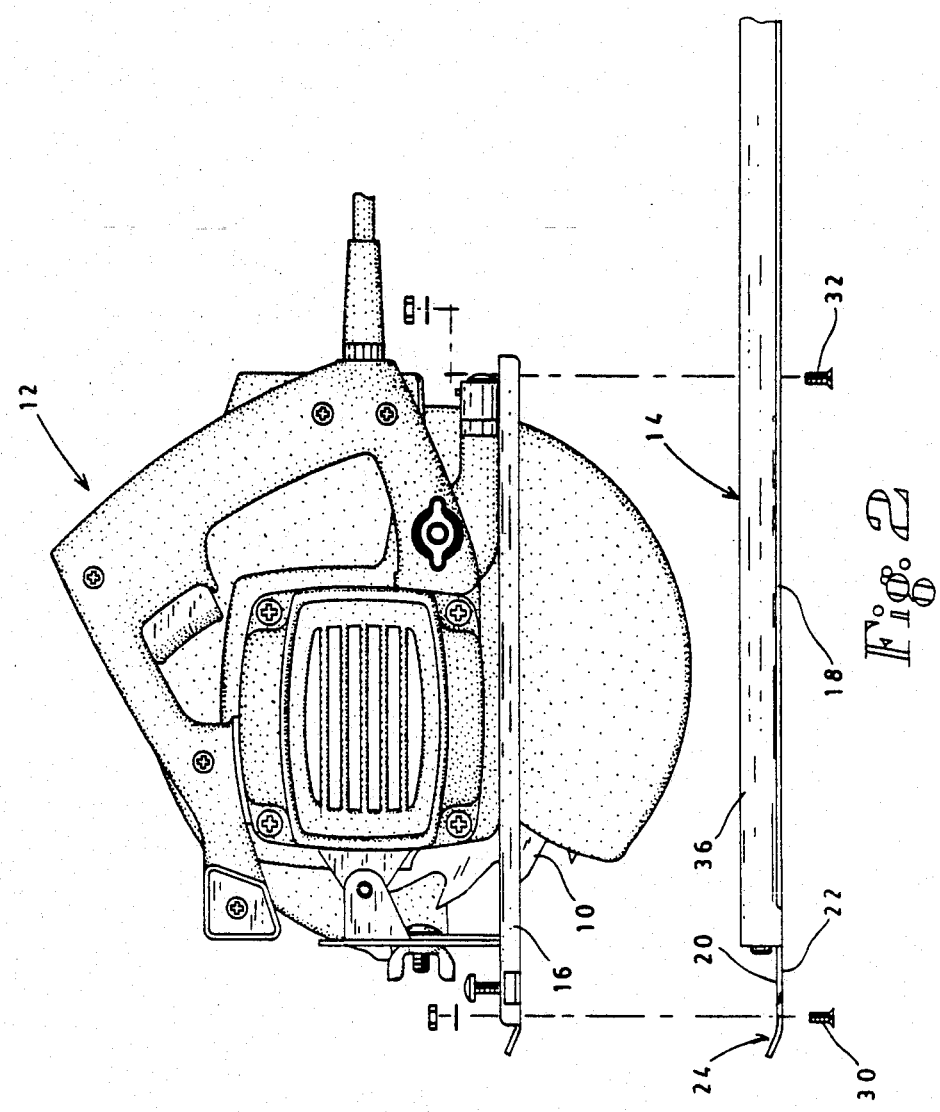
FIG. 2 is a side elevation view of the guide illustrated in FIG. 1 prior to its being mounted on a saw.

Referring now to the figures, a saw guide for controlling the path/direction of travel of a rotary or jig blade 10 of a saw 12 is generally indicated at 14 in FIG. 1. This guide 14 is adapted for being secured to the base plate 16 (see FIG. 2) of a conventional skill saw or other suitable saw, such as a jig saw. The guide includes a carriage 18 having an upper surface and a lower surface 22. These surfaces 20 and are substantially planar. The carriage 18 further includes a front edge portion 24 and a rearward edge portion 26 as shown in FIG. 1. The edge portions 24 and 26 are sloped upwardly to facilitate the sliding movement of the carriage with respect to the surface of an object which is being cut and upon which the carriage rests during cutting operations. As shown in FIG. 1, the carriage 18 defines an opening 28 which is proportioned for registering with at least a portion of the opening 19 in the juxtaposed saw blade base plate 16 through which the saw blade and guard extend as shown in FIGS. 2 and 6 below such base plate. Further, the screws 30 and 32 shown in FIG. 2 and the additional screws shown in FIG. 1 serve to secure the carriage 18 to the base plate 16 of the saw.

A sleeve generally indicated at 36 in FIG. 2 is carried by the carriage proximate longitudinal edge portion 38 of such carriage. It will be noted in FIG. 1, that the opposite longitudinal edge portion 40 of the carriage is sloped upwardly or upturned to assist in preventing a binding of the carriage with the object being cut as the carriage slides over such object. This sleeve 36 in the illustrated embodiment is fabricated by curling the longitudinal edge portions of the carriage as illustrated in FIG. 6 such that an elongated opening 41, as shown in FIG. 6, is defined therein. This opening is proportioned for receiving a bushing 42 which serves to assist in preventing binding of the sleeve and/or bushing contained therein with a rod 44 which might otherwise be occasioned by the build up of saw dust or debris therein, as will be apparent hereinafter.

Rod 44 is slidably received within the sleeve 36, or more particularly, as illustrated in FIG. 6, within the bushing 42 carried by the sleeve 36 in the preferred embodiment. This rod defines first and further end portions which are substantially coextensive with the length of the sleeve in the preferred embodiment as illustrated in FIG. 2.

Figure 3:
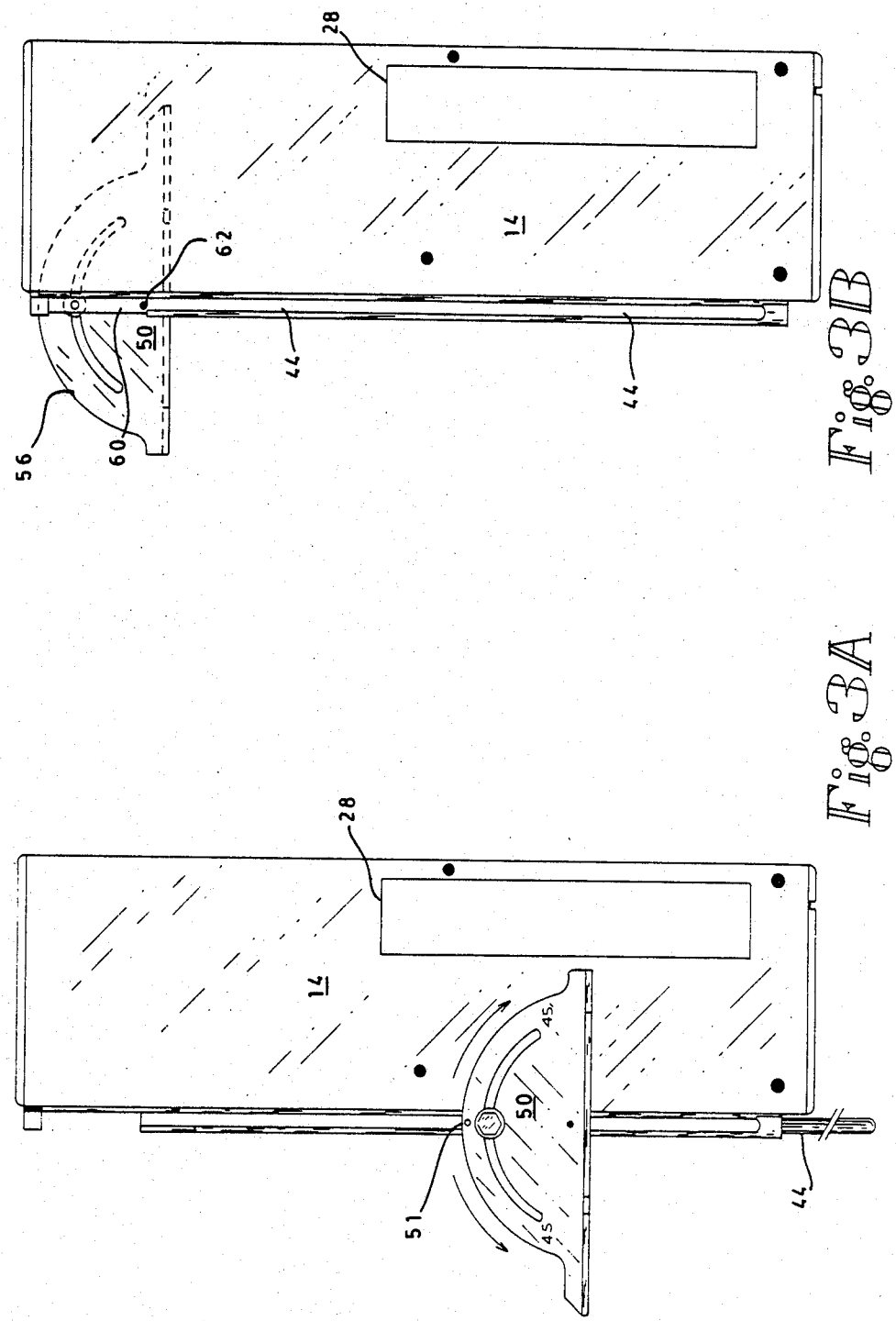
FIG. 3A is a plane view of the guide illustrated in FIG. 1.
FIG. 3B illustrates the position of the protractor when it is moved to its storage location.
Figure 4:
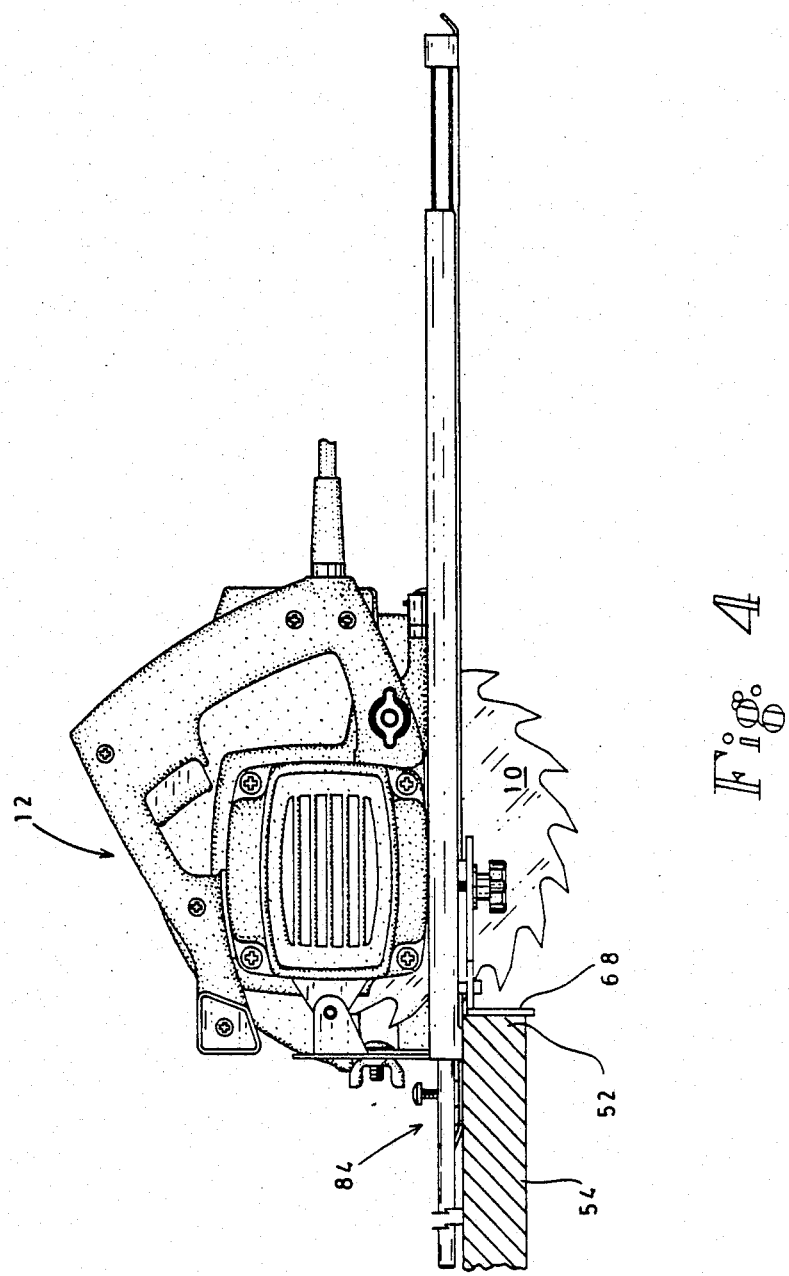
FIG. 4 is a side elevation view of the guide mounted on a saw prior to commencing the cutting operation.

A travel control mechanism is generally indicated at 50 in FIG. 1. This travel control mechanism serves to control the direction or linear path of travel of the saw from an illustrated reference 52 as illustrated in FIG. 4. This reference 52 is normally the end surface of a board 54 or another object which is being cut. The travel control mechanism includes a protractor 56. This protractor is rotatably mounted on end portion 60 of the rod 44 (see FIG. 3B), and more specifically is rotated about a pivot point 62 which comprises a suitable screw or stud connecting the protractor and the rod 44. The travel control mechanism further includes mechanism for adjusting the rotation of the protractor 56 with respect to the rod 44. This mechanism for adjusting also includes means for securing the position of the protractor with respect to the axis of the rod. This mechanism 64 comprises a suitable knob and operatively associated screw having a shaft which is received within an internally threaded bore within the end portion 60 of the rod 44. It will be noted that the shaft of the screw comprising a portion of the mechanism 64 is received within an arcuate slot 66 defined in the protractor. Thus, the position of the protractor can be adjusted and secured by unthreading or threadably removing the mechanism 64 such that the knob and/or operatively associated washer is removed from the upper surface of the protractor as shown in FIG. 1. The protractor can then be pivoted on or rotated about the pivot point 62 as illustrated in FIG. 3B, moved into a desired position and then secured again into position by screwing down the knob of the mechanism 64 such that the protractor is firmly held in position with respect to the longitudinal axis of the rod 44. It will be recognized that in this connection, a protractor face plate 68 which is integrally formed with the protractor 56 serves to engage the reference 52 (see FIG. 4). This face or face plate 68 is pivoted simultaneously with the protractor with respect to the longitudinal axis of the rod 44 by the adjustment mechanism 64.

Figure 5:
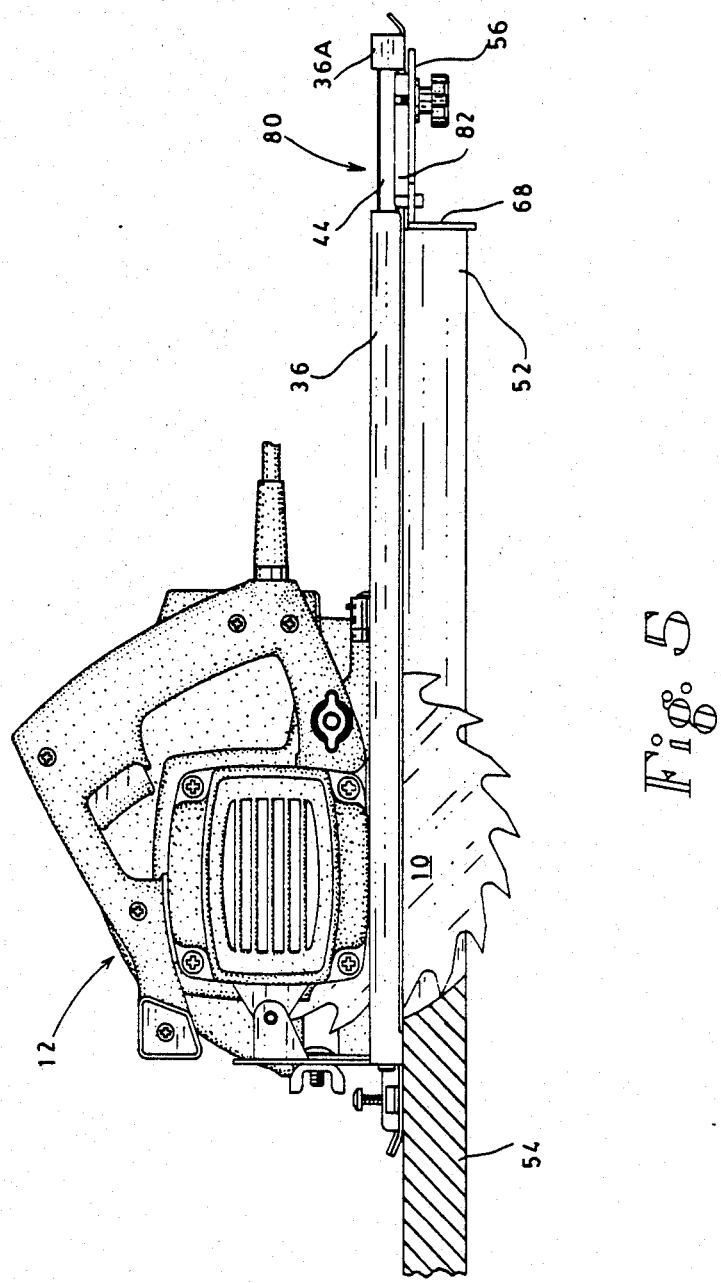
FIG. 5 is a side elevation view as shown in FIG. 4 with the saw advanced into the board or other suitable object to be cut.

Thus, the angle of linear travel of the saw blade with respect to the reference 52 can be controlled by adjusting the protractor and the operatively associated face plate 68 with respect to the reference 52. More specifically, as shown in FIG. 4, the face plate 68 is placed against the reference 52. The saw is then advanced as shown in FIG. 5 in the direction of the axis of the rod 44. The angle of the travel of the saw is controlled by a travel control mechanism 50, or more specifically, by the angle between the rod axis along which the device 14 slides, and the angle adjusted on the protractor.

It will be noted in FIG. 1 that means are provided to assist in sensing the movement of the protractor 56 with respect to the reference 52 during cutting operations. More specifically, a suitable finger/thumb opening 70 is provided such that an operator can simultaneously hold the face plate in position while feeling the reference 52 engaged by the face plate. Thus, any movement of the face plate with respect to the reference will be immediately sensed by the operator such that he can make proper adjustment.

As shown in FIG. 1, the end portion of the face plate 68 opposite the opening 70 ss sloped. This sloped end portion allows movement of the saw blade 10 past the face plate 68 when the saw blade 10 is pivoted or slanted with respect to the face plate 68 prior to commencing a cutting operation. In this manner, the saw blade does not contact the protractor means or the face plate during cutting.

Figure 7A:
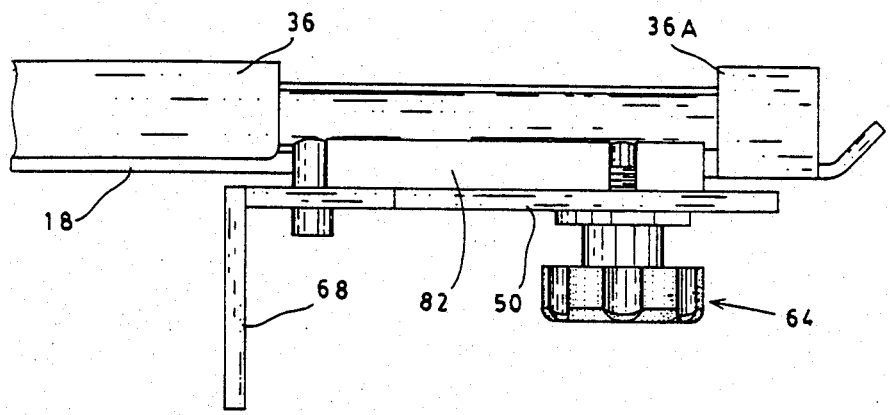
FIGS. 7A and 7B illustrate the mechanism for enabling the protractor to be pivoted out of position such that the saw can be used in its conventional manner, as desired.
Figure 7B:
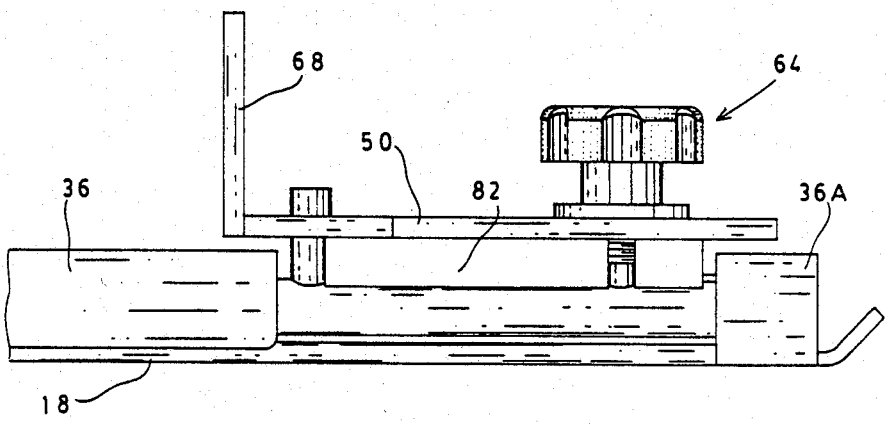

In the illustrated embodiment, storage means serves to enable pivotal movement of the protractor 56 from its position below the surface 22 of the carriage 18 (a position for controlling the travel of the device 14) to a position for storage above the surface 20 of the carriage 18. In this regard, the sleeve 36 is provided with a spaced apart end portion 36A. This spacing of the sleeve/sleeve section enables rotational or pivotal movement of the protractor from the position shown in 3A to the position shown in 3B. More specifically, in the preferred embodiment, the spacer 82 which connects the rod 44 with the protractor 56 can rotate between the sleeve 36 and the sleeve end portion 36A such that the protractor can be moved to its stored location above the carriage (see FIGS. 7A and 7B, respectively).

In accordance with another feature of the invention, the forward end portion proximate the location 84 as shown in FIG. 4 of the sleeve 36 is removed to allow movement of a suitable rip fence of conventional design therethrough. Further, in the embodiment shown in FIG. 3A, the pointed end portion 51 of the rod can be used to indicate the rotational position of the protractor.

Figure 8:
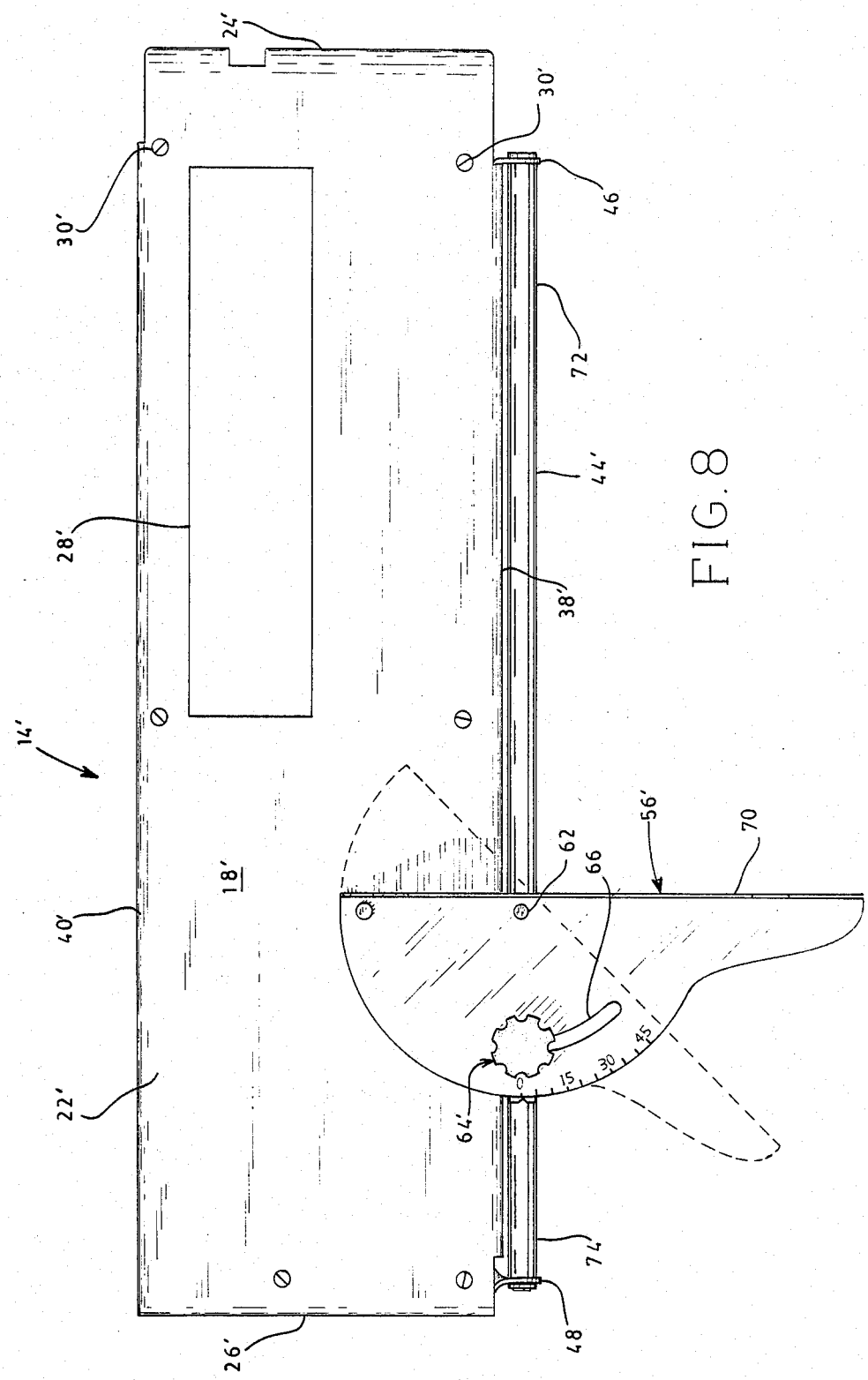
FIG. 8 illustrates a bottom view of an alternate embodiment of the saw guide of the present invention.
Figure 9:
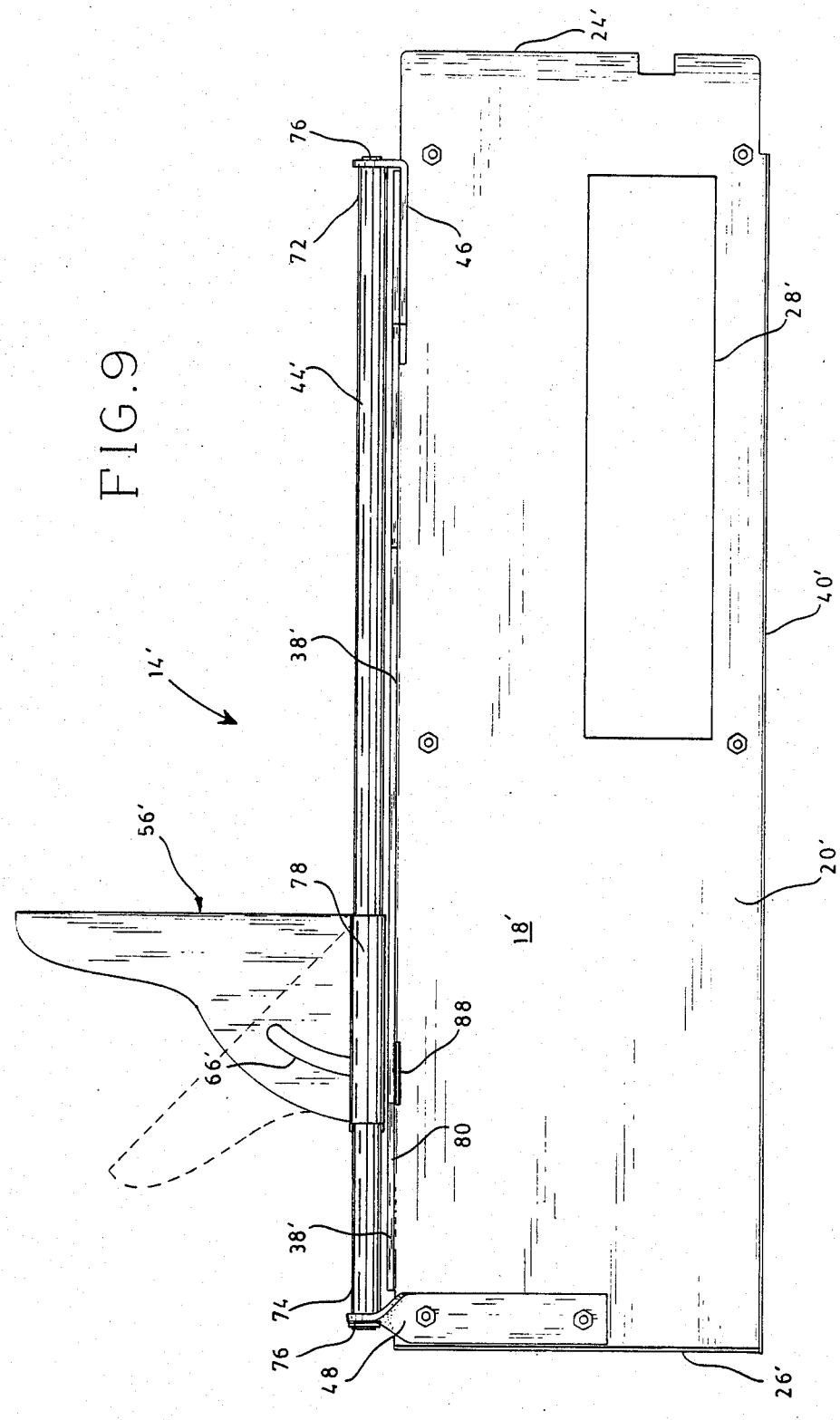
FIG. 9 illustrates a top view of an alternate embodiment of the saw guide of the present invention.

An alternate embodiment of the saw guide of the present invention is illustrated at 14' in FIGS. 8 through 11. It will be noted that components which the guide 14' has in common with the previously described embodiment are referenced by common prime numbers. As illustrated in FIGS. 8 and 9, the carriage 18' is not provided with the sleeve 36 of the guide 14. Instead, the rod 44' is secured at its opposite end portions to the carriage 18' so as to be disposed parallel to, and at a selected spaced apart distance from, the longitudinal edge portion 38' of the carriage 18'. More specifically, the carriage 18' is provided with a first bracket member 46 mounted proximate the front edge portion 24' of the carriage 18' and a second bracket member 48 mounted proximate the rearward edge portion 26' of the carriage 18'. As illustrated, the first bracket member 46 engages the first end portion 72 of the rod 44' and the second bracket member 48 engages the second end portion 74 of the rod 44', thereby securing the rod 44' at a selected distance from, and substantially parallel to, the longitudinal edge portion 38' of the carriage 18'. As illustrated in FIG. 9, the bracket members 46 and 48 can each be secured to the rod 44' with a screw 76 which is received in a threaded receptor (not shown) provided in each of the end portions 72 and 74 of the rod 44'. However, it will be understood that other securing means can be utilized.

Figure 10:
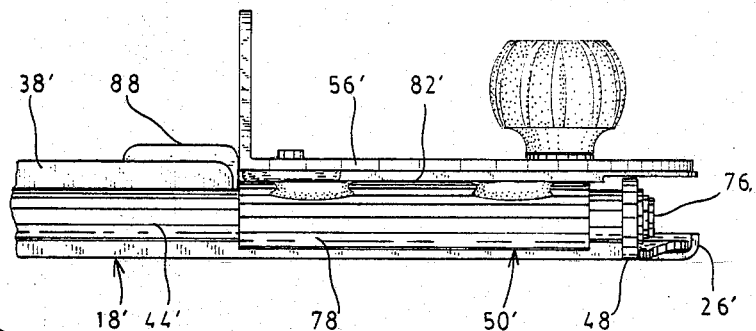
FIG. 10 illustrates an alternate mechanism for enabling the protractor to be pivoted out of position such that the saw can be used in its conventional manner, as desired.

Referring now to FIG. 10, the travel control mechanism 50' of the guide 14' comprises a sleeve 78 which slidably receives the rod 44' such that the sleeve 78 can be selectively moved along the rod 44' between the bracket member 46 and 48. The sleeve 78 carries a spacer member 82' to which the protractor 56' is pivotally secured as discussed hereinabove with respect to the travel control mechanism 50 of the guide 14. Thus, it will be understood that in the saw guide 14' the mechanism 50' travels along the stationary rod 44' rather than slidably moving with the rod as is the case with the guide 14.

Figure 11:
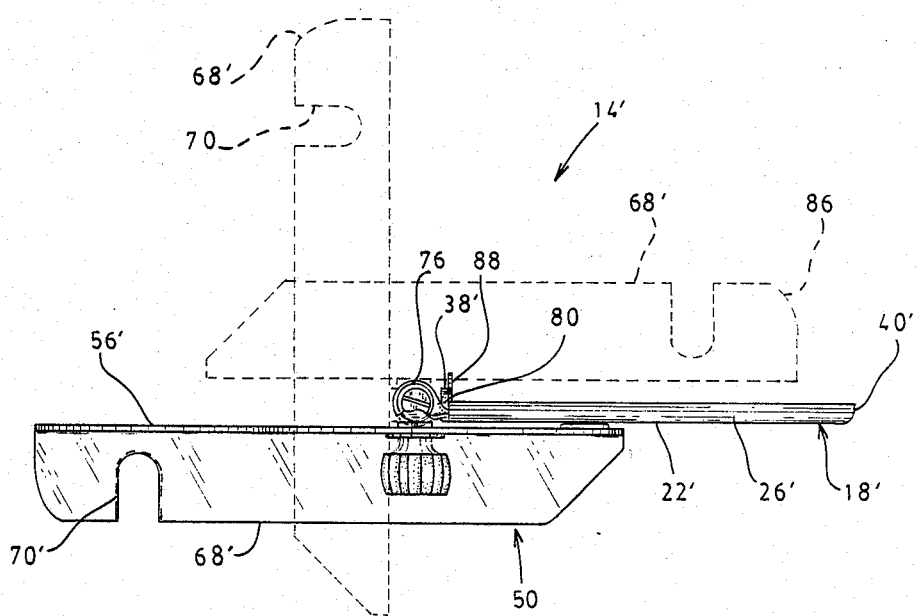
FIG. 11 illustrates a rearward end view of an alternate embodiment of the saw guide of the present invention.

Further, the guide 14' is provided with storage means serving to enable pivotal movement of the protractor 56' from its position below the surface 22' of the carriage 18' (a position for controlling the travel of the device 14') to a position for storage above the surface 20' of the carriage 18'. In this regard, as with the guide 14, the longitudinal edge portion 38' of the carriage 18' is slopped upwardly or upturned to assist in preventing a binding of the carriage 18' with the object being cut as the carriage slides over such object. Proximate the rearward end portion 26' of the carriage 18', the upturned edge portion 38' defines a cut away portion 80 (see FIG. 9). As illustrated in FIGS. 10 and 11, the cut away portion 80 is provided to accommodate the locating of the protractor 56' into the storage position illustrated at 86 of FIG. 11, such positioning being accomplished by locating the control mechanism 50' adjacent the cut away portion 80 and rotating the control mechanism 50' about the axis of the rod 44'. It will also be noted that a stop member 88 is provided proximate the longitudinal edge portion 38' forward of the cut away portion 80 for prohibiting the forward movement of the travel control mechanism 50' while the mechanism 50' is in the storage position. More specifically, the stop member 88 prohibits the forward travel of the mechanism 50' by engaging the protractor 56' thereby maintaining the mechanism 50' out of the way while not in use.

From the foregoing detailed description, it will be recognized that an improved saw guide has been provided which can be readily moved to a stored location when its use is not desired. The guide of the present invention is inexpensive to construct and includes a travel control mechanism which is mounted such that the deleterious effect on the depth of the cut of the blade is reduced. Various rigid and/or semi-rigid materials can be used to fabricate the guide. Further, the guide can be readily mounted On a conventional rotary or jig saw without the need for a special tool or for mechanical skills. Further, it will be noted that the effective depth of the cut of the blade is reduced only by an amount substantially equal to the thickness of the carriage.

While a preferred embodiment has been shown and described, it will be understood that there is no intent to limit the invention by such disclosure, but rather it is the intention to cover all modifications and all constructions falling within the spirit and scope of the invention as defined within the appended claims.

I claim:

1. A saw guide for controlling the path/direction of travel, with respect to a selected reference on an object such as a board to be cut, of a rotary or jig saw blade during cutting operations, said saw guide being secured to the base plate of a rotary or jig blade type saw and including:

a carriage having upper and lower substantially planar surfaces and defining first and further longitudinal edge portions, a forward edge portion and a rearward edge portion, said first and further longitudinal edge portions and said forward and rearward edge portions being sloped upwardly to facilitate sliding movement of said carriage with respect to said object to be cut, said carriage defining an opening for receiving a rotary or jig saw blade therethrough, said carriage opening being proportioned for registering with at least a portion of an opening in said base plate of said saw upon mounting said carriage thereon;

rod means mounted on said carriage so as to be disposed proximate and substantially parallel to said first longitudinal edge portion, said rod means defining first and further end portions; and travel control means for controlling the direction of travel of said saw from a reference defined on said object to be cut, said travel control means including a movable sleeve for being slidably received by said rod means and including protractor means rotatably mounted on said sleeve, said protractor means including means for adjusting the rotational position of said protractor means with respect to a longitudinal axis of said rod, and protractor face plate means which engages said reference from which the direction of travel of said saw is controlled, said first longitudinal edge portion of said carriage being provided with a cut away portion proximate said rearward edge portion of said carriage to provide storage means for enabling pivotal movement of said protractor means from a position below said lower surface of said carriage to a stored location proximate said upper surface of said carriage whereby said cut away portion accommodate said protractor such that the motion of said saw is controlled by said saw guide and said saw can be used in a conventional manner as though said saw guide had been removed.

2. The guide of claim 1 wherein said storage means further comprises a stop member for releasably engaging said protector means in said stored position whereby the forward movement of said travel control means is restricted.

3. A saw guide for controlling the path/direction of travel, with respect to a selected reference on an object such as a board to be cut, of a rotary or jig saw blade during cutting operations, said saw guide being secured to the base plate of a rotary or jig blade type saw and including a carriage having upper and lower substantially planar surfaces and defining first and further upturned longitudinal edge portions, an upturned forward edge portion and an upturned rearward edge portion, said first upturned longitudinal edge portion defining a cut away portion proximate said rearward edge portion, said carriage carrying a stop member forward of said cut away position, said carriage further defining an opening for receiving a rotary or jig saw blade therethrough, said carriage opening blade proportioned for registering with at least a portion of an opening in such saw blade base plate upon mounting said carriage thereon, said carriage being provided with a first bracket member mounted proximate said forward edge portion and extending outwardly from said first longitudinal edge portion, and a second bracket member mounted proximate said rearward edge portion and extending outwardly from said first longitudinal edge portion;

a rod having a first end portion secured to said first bracket and a second end portion secured to said second bracket whereby said rod is disposed a selected distance from and substantially parallel to said first longitudinal edge portion; and travel control means for controlling the direction of travel of said saw from a reference defined on an object to be cut, said travel control means including a movable sleeve for being slidably received by said rod, said sleeve carrying a spacer member, said travel control means further comprising protractor means rotatably mounted on said spacer member of said movable sleeve, said protractor means including means for adjusting the rotational position of said protractor with respect to a longitudinal axis of said rod, and protractor face plate means which engage said reference from which the direction of travel of said saw is controlled, said protractor face plate means including means to enable sensing of movement of said protractor means with respect to said reference during cutting operations, said cut away portion of said first longitudinal edge portion permitting pivotal movement of said protractor means on said rod form an operating position below said lower surface to a stored position above said upper surface of said carriage.

* * * * *